United States Patent [19]
Colin

[11] 3,788,259
[45] Jan. 29, 1974

[54] COUPLING DEVICE OF USE INTER ALIA FOR THE CONNECTION BETWEEN A BARGE AND A PUSHER TUG

[75] Inventor: Jean Paul Colin, Nantes, France

[73] Assignee: Societe Financiere Et Industriele Des Ateliers Et Chantiers De Bretagne, Nantes, Loire Atlantique, France

[22] Filed: July 10, 1972

[21] Appl. No.: 269,979

[30] Foreign Application Priority Data
Feb. 16, 1972 France .............................. 7205195

[52] U.S. Cl.............. 114/235 A, 280/508, 213/88, 24/241 PP
[51] Int. Cl............................................. B63b 21/62
[58] Field of Search............ 114/235 R, 235 A, 230; 280/504, 508, 510; 213/88, 175; 24/241 P, 241 PP, 241 SB

[56] References Cited
UNITED STATES PATENTS

| 3,052,487 | 9/1962 | Harbers et al. ..................... 280/508 |
| 3,613,628 | 10/1971 | Garcia............................. 114/235 R |
| 2,404,329 | 7/1946 | Wallace ........................... 114/235 A |

FOREIGN PATENTS OR APPLICATIONS

| 1,173,813 | 7/1964 | Germany ........................ 114/235 A |

Primary Examiner—Duane A. Reger
Assistant Examiner—Edward R. Kazenske
Attorney, Agent, or Firm—Stevens, Davis, Miller & Mosher

[57] ABSTRACT

A coupling assembly for coupling a barge and pusher tug comprises a recess having at one end a hook and at the other an abutment. A pawl pivots to displace a coupling element from the hook.

5 Claims, 3 Drawing Figures

COUPLING DEVICE OF USE INTER ALIA FOR THE CONNECTION BETWEEN A BARGE AND A PUSHER TUG

This invention relates to coupling and uncoupling an element such as the rod of a reciprocating actuator.

As a rule, of course, the connection between a barge and a seagoing pusher tug is provided by means of a double-acting reciprocating actuator which is mounted on the tug and whose rod is engaged in hooks on the barge, the actuator ensuring that bearing surfaces on the barge and the tug are kept tightly engaged with one another and that the two vessels can separate from one another when the barge is uncoupled.

It is a main object of this invention to provide a simple, rugged and easily engageable coupling facility or device which can release readily upon separation of the devices which it had previously interconnected.

According to the invention, the coupling device comprises an inclined surface followed by a recess bounding the formation, at the end nearest the inclined surface, of a hook and, at the other end, of an abutment for a coupling member, the abutment being associated with a release pawl adapted to bridge the hooked part of the hook when the coupling member is applied to the abutment, for automatic release of the coupling member when the same moves back.

The following description, taken together with the accompanying exemplary drawings, will show clearly how the invention can be carried into effect. In the drawings.

Figure 1:
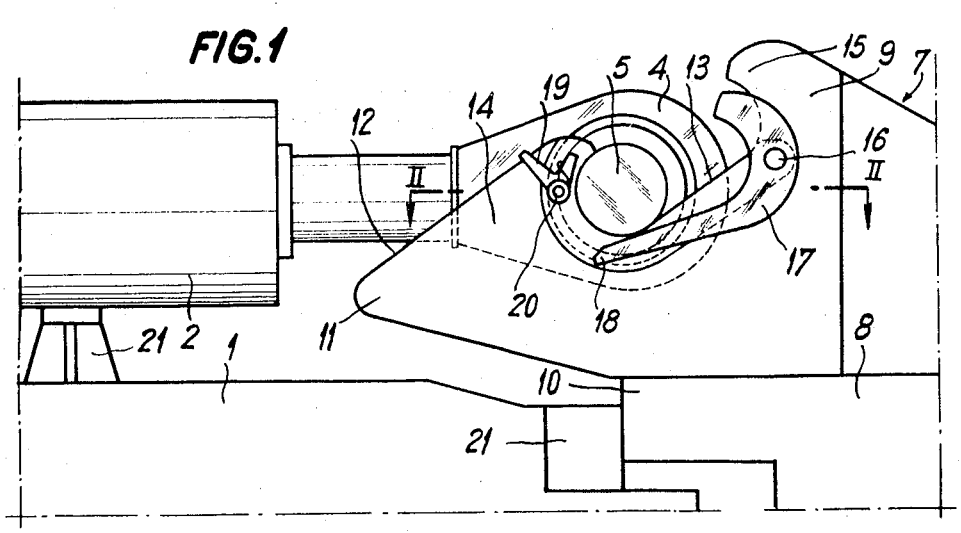
FIG. 1 is a view in side elevation of a coupling device according to the invention.

In the embodiment shown in the drawings, a pusher tug 1 has disposed on it a double-acting reciprocating actuator or ram or the like 2 having a rod 3 terminating in a yoke 4 having at its centre a cylindrical coupling spindle or shaft 5. The same is mounted in yoke 4 by means of a central swivel joint 6 (FIG. 2) on shaft 5, swivel joint 6 serving to take up possible misalignments in respect of a coupling point 7 on barge 8.

Figure 2:
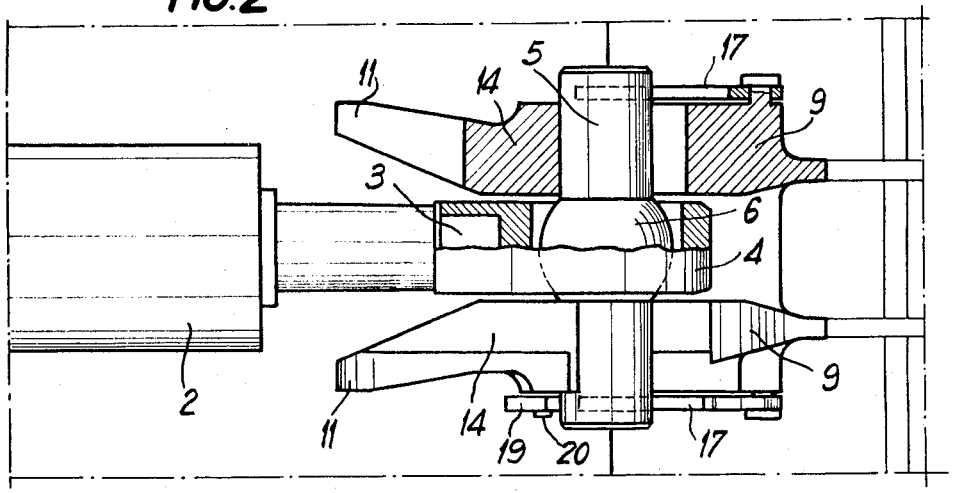
FIG. 2 is a plan view with a section on the line II—II of FIG. 1.

Coupling point 7 comprises two vertical uprights 9 which project towards the rear of the barge beyond the abutment edge 10 thereof, by way of slightly divergent acute-angled members 11 (FIG. 1), as shown in FIG. 2, to facilitate the movement of yoke 4 between the uprights 9.

The same are disposed symmetrically of their longitudinal centre-plane. At the top, after an oblique inclined surface 12 which forms the top part of member 11, the uprights 9 are formed with a recess 13 whose base is substantially parallel to surface 12 and which at its bottom end bounds the shape of a hook 14 and at its top end bounds the shape of an abutment 15. Those faces of the integers 14, 15 which are opposite one another are part-cylindrical and have the same radius of curvature as the integer 5 of the actuator rod.

Figure 3:
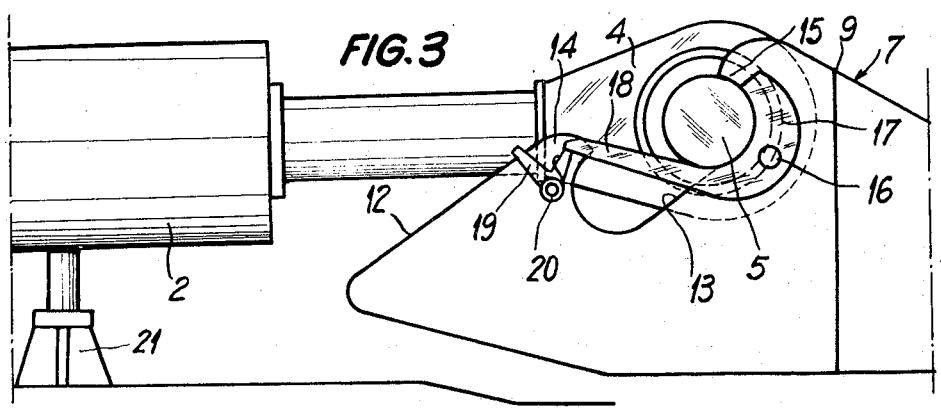
FIG. 3 is a view showing details to explain the release operation.

A crook-shaped pawl 17 is pivotally mounted on a transverse pivot 16 along the outside surface of each upright 9; the inside curved surface of the curved portion of pawl 17 also has the same radius of curvature as the integer 5. The pawls 17 are symmetrical and are arranged symmetrically; consequently, when shaft 5 is engaged with abutment 15 in the manner shown in FIG. 3, the top surface of a straight rod 18 of the pawls 17 comes flush with the top surface of the crook 14, along which the last-mentioned rod moves.

V-shaped side members 19 are pivoted on pivots 20 laterally of the hooks 14 and are returned, e.g. by resilient means or by counterweighting, into the position shown in the drawings, in which position their front arm keeps the corresponding pawl raised, if necessary, while their rear arm projects on to the surface 12.

The coupling facility just described can be used as follows.

At coupling, yoke 4 of the actuator rod moves between the uprights 9 and shaft 5 passes the surfaces 12 to drop into the recesses 13, whereafter the actuator rod moves back and the shaft 5 bears on the crooks 14 in which it is trapped (FIG. 1). The actuator rod continues to move back until the barge edge 10 engages with the abutments 21 of the tug, whereafter the actuator rod is locked and the hooks 14 take the clamping force serving to connect the barge and tug together.

To release the tug, a thrust must be applied to the barge in the opposite direction to the clamping force just mentioned. Accordingly, the actuator rod is extended so that the shaft 15 engages with and thrusts on the abutments 15 of the uprights 9. As it moves along the bottom of the recesses 13, the shaft 5 pivots the pawls 17, and the rods 18 thereof first push back the members 19 and then rest thereon.

The tug moves away from the barge, and when there is a sufficient distance between the two vessels, the actuator rod moves back relatively to the coupling station, the shaft 5 following first the pawl rods 18 and then the inclined surfaces 12 of the uprights 9. As it passes by the shaft 5 pivots the members 19 rearwardly so that the same release the pawls 17 which return to their original position. The mechanism is then ready for a further coupling operation.

The invention is of use for coupling together a very wide variety of devices, vehicles or the like. It is particularly useful for coupling a barge or similar vessel with a pusher tug.

In the case of heavy actuators which apply large forces, the mounting should be on an e.g. hydraulic damper 21, which damps tilting of the actuator when the shaft, having passed beyond the crooks 14, drops into the recesses 13. A damper of this kind may be simpler and cheaper than the auxiliary actuator used in some known systems and needs no supervision.

I claim:

1. A coupling assembly for connecting a barge vessel and a pusher tug vessel, comprising:

at least one upright member having an inclined outer surface, said member mounted on one of said vessels;

said upright member having a recess therein defining a hook at the end of said upright member nearest said inclined surface and defining an abutment for a coupling member at the opposite end of said upright member;

a coupling member, movable in a forward and a backward direction and mounted on the other of said vessels, for coupling with said upright member;

a release pawl associated with said abutment, said release pawl adapted to move to a coupling position into the hook, and to a release position bridging said hook when said coupling member is applied to said abutment, said release pawl being combined with a bolt for retaining the pawl in said release position for automatically releasing said coupling member upon backward movement of the coupling member along said release pawl, said bolt retractable by said coupling member when said coupling member moves backward on the inclined surface, so that the pawl can return to said coupling position.

2. The assembly of claim 1 wherein said recess terminates in said abutment having a part-cylindrical bearing surface, and said pawl comprises a crook portion and a rod portion, said crook portion having an inside surface with the same radius of curvature as said abutment, said pawl being articulated so that when said inside surface of said crook portion is located as an axial extension of the part-cylindrical surface of said abutment, an inside surface of said rod portion of said pawl approximately extends the top surface of the end of said upright member nearest said inclined surface.

3. The assembly of claim 1 wherein the pawl bolt is V-shaped, one of its arms projects beyond the inclined surface into the path of the coupling member, and the other arm serves to stop the pawl.

4. The assembly of claim 1 wherein said upright member comprises two uprights symmetrical with respect to a center plane, and the coupling member has a shaft disposed transversely on a support movable between said uprights.

5. The assembly of claim 4 wherein the shaft is mounted on its support member by way of a swivel joint.

* * * * *